United States Patent
Chen et al.

(10) Patent No.: US 10,298,308 B2
(45) Date of Patent: May 21, 2019

(54) METHOD FOR OPTIMIZING RANK OF CHANNEL MATRIX, WIRELESS BASE AND MOBILE STATION

(71) Applicant: NTT DoCoMo, Inc., Tokyo (JP)

(72) Inventors: Xiaohang Chen, Beijing (CN); Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 74 days.

(21) Appl. No.: 15/058,552

(22) Filed: Mar. 2, 2016

(65) Prior Publication Data

US 2016/0261324 A1  Sep. 8, 2016

(30) Foreign Application Priority Data

Mar. 4, 2015  (CN) .......................... 2015 1 0096688

(51) Int. Cl.
*H04B 7/06* (2006.01)
*H04W 72/12* (2009.01)
(Continued)

(52) U.S. Cl.
CPC ........... *H04B 7/063* (2013.01); *H04B 7/0426* (2013.01); *H04B 7/0452* (2013.01); *H04B 7/0626* (2013.01); *H04B 7/0632* (2013.01); *H04B 7/0639* (2013.01); *H04B 7/0689* (2013.01); *H04B 17/26* (2015.01); *H04L 5/0091* (2013.01); *H04L 25/03923* (2013.01); *H04W 72/06* (2013.01); *H04W 72/12* (2013.01)

(58) Field of Classification Search
CPC . H04B 7/063; H04B 7/0632; H04L 25/03923; H04W 72/1226; H04W 72/12
See application file for complete search history.

(56) References Cited

U.S. PATENT DOCUMENTS

| 2011/0044272 A1* | 2/2011 | Cui ...................... H04B 7/0452 370/329 |
| 2012/0213169 A1* | 8/2012 | Wang ...................... H04B 7/04 370/329 |
| 2013/0294538 A1* | 11/2013 | Zhou .................... H04B 7/0469 375/267 |

FOREIGN PATENT DOCUMENTS

WO   WO-2011/008519 A1   1/2011

OTHER PUBLICATIONS

Extended European Search Report for corresponding application EP 16156918.1, EPO, Munich, dated Apr. 12, 2017.
(Continued)

*Primary Examiner* — Salvador E Rivas
(74) *Attorney, Agent, or Firm* — Harness, Dickey & Pierce, P.L.C.

(57) ABSTRACT

Embodiments of present invention provide a method for optimizing the rank of channel matrix, a wireless base and a mobile station. The method for optimizing the rank of channel matrix according to an embodiment of the present invention is applied to a wireless base to which multiple mobile stations are connected. The method includes: obtaining the historical state data of the multiple mobile stations; determining the optimal rank of channel matrix of a first mobile station of the multiple mobile stations according to the obtained historical state data of the multiple mobile stations; and transmitting to the first mobile station the optimal rank indicator indicating the optimal rank so as to cause the first mobile station to set its rank of channel matrix to be the optimal rank indicated by the optimal rank indicator.

10 Claims, 4 Drawing Sheets

(51) Int. Cl.
*H04L 25/03* (2006.01)
*H04W 72/06* (2009.01)
*H04B 7/0426* (2017.01)
*H04B 7/0452* (2017.01)
*H04B 17/26* (2015.01)
*H04L 5/00* (2006.01)

(56) References Cited

OTHER PUBLICATIONS

Partial European Search Report for EP16156918.1, EPO, Munich, Germany, dated Sep. 19, 2016.

* cited by examiner

METHOD FOR OPTIMIZING RANK OF
CHANNEL MATRIX, WIRELESS BASE AND
MOBILE STATION

BACKGROUND

The present invention relates to a method for optimizing the rank of channel matrix, a wireless base and a mobile station. More particularly, the present invention relates to a method for optimizing the rank of channel matrix using the state data of a mobile station as well as a wireless base and a mobile station.

In a Multiple-Input Multiple-Output (MIMO) communication system, the communication state of a mobile station itself is detected to determine the rank of channel matrix applicable to the mobile station. The mobile station performs the Channel State Information (CSI) detection according to the determined rank of channel matrix, and notifies the result of the detection to a wireless base, so that the wireless base is able to determine the data flow to be transmitted to the mobile station according to the rank of channel matrix determined by the mobile station and the corresponding result of the channel detection. However, in a conventional method for determining the rank of channel matrix, the rank of channel matrix applicable to a mobile station are determined according to only the result of the detection of the communication state of the mobile station itself without considering the interference between mobile stations.

On the other hand, in order to improve the capacity of a communication system, a communication system in which multiple mobile stations may share a same time and/or frequency resource has been proposed. For example, in a Non-Orthogonal Multiple Access (NOMA) system, multiple mobile stations connected to a same wireless base may form a mobile station pair, mobile stations in each mobile station pair share same time and frequency resources, and mobile stations in the mobile station pair are distinguished from each other by the transmission power. However, in such a communication system, the problem that there is the interference between multiple mobile stations sharing same time and/or frequency resources is more prominent. This leads to that the rank of channel matrix of the mobile station determined according to only the result of the detection of the communication state of the mobile station itself may not be optimal, thus influencing the communication state of the mobile station, for example, throughput and the like.

SUMMARY

In view of the above problem, it is desired to prove a method for optimizing the rank of channel matrix, a wireless base and a mobile station to make the determined rank of channel matrix of the mobile station optimal.

According to one embodiment of the present invention, there is provided a method for optimizing the rank of channel matrix and being applied to a wireless base to which a plurality of mobile stations are connected. The method comprises: obtaining the historical state data of the plurality of mobile stations; determining the optimal rank of channel matrix of a first mobile station of the plurality of mobile stations according to the obtained historical state data of the plurality of mobile stations; and transmitting to the first mobile station the optimal rank indicator indicating the optimal rank so as to cause the first mobile station to set its rank of channel matrix to be the optimal rank indicated by the optimal rank indicator.

According to another embodiment of the present invention, there is provided a method for optimizing the rank of channel matrix, which is applied to a first mobile station. The method comprises: detecting whether an optimal rank indicator for the first mobile station is transmitted from a wireless base to which a plurality of mobile stations comprising the first mobile station are connected; setting the rank of channel matrix of the first mobile station to be the optimal rank indicated by the optimal rank indicator when the optimal rank indicator for the first mobile station is detected, the optimal rank being determined by the wireless base according to the historical state data of the plurality of mobile stations; and performing an adaptive processing of the rank of channel matrix when the optimal rank indicator for the first mobile station is not detected.

According to another embodiment of the present invention, there is provided a wireless base connected to a plurality of mobile stations. The wireless base comprises: a data acquisition unit configured to obtain the historical state data of the plurality of mobile stations; a processing unit configured to determine the optimal rank of channel matrix of a first mobile station of the plurality of mobile stations according to the obtained historical state data of the plurality of mobile stations; and a transmission unit configured to transmit to the first mobile station the optimal rank indicator indicating the optimal rank so as to cause the first mobile station to set its rank of channel matrix to be the optimal rank indicated by the optimal rank indicator.

According to another embodiment of the present invention, there is provided a mobile station comprising: a reception unit configured to detect whether an optimal rank indicator for the mobile station is transmitted from a wireless base; a processing unit configured to set the rank of channel matrix of the mobile station to be the optimal rank indicated by the optimal rank indicator when the optimal rank indicator for the first mobile station is detected, and performs an adaptive processing of the rank of channel matrix when the optimal rank indicator for the first mobile station is not detected, wherein a plurality of mobile stations comprising the mobile station are connected to the wireless base, the wireless base determines the optimal rank according to the historical state data of the plurality of mobile stations.

In the scheme according to the present invention, the optimal rank of channel matrix of one mobile station is determined by a wireless base according to the historical state data of multiple mobile stations connected to the wireless base. When selecting the optimal rank of channel matrix for the mobile station, the wireless base considers not only the state of the mobile station itself but also the possible interference to the mobile station from other mobile stations, so that the selection may be carried out more accurately to improve the communication state of the mobile station.

DETAILED DESCRIPTION OF THE EMBODIMENTS

In the following, preferred embodiments of the present invention will be described in detail with reference to attached drawings. Note that, in the present specification and attached drawings, substantially same steps and elements are represented by same reference signs and repeated explanation of these steps and elements will be omitted.

A method for optimizing the rank of channel matrix according to one embodiment of the present invention may be applied to a wireless base connected to multiple mobile stations. According to one example of the present invention, a first mobile station of the multiple mobile stations is able to form mobile station pairs with other mobile stations of the multiple mobile stations, and mobile stations in each mobile station pair share same time and/or frequency resources.

Figure 1:
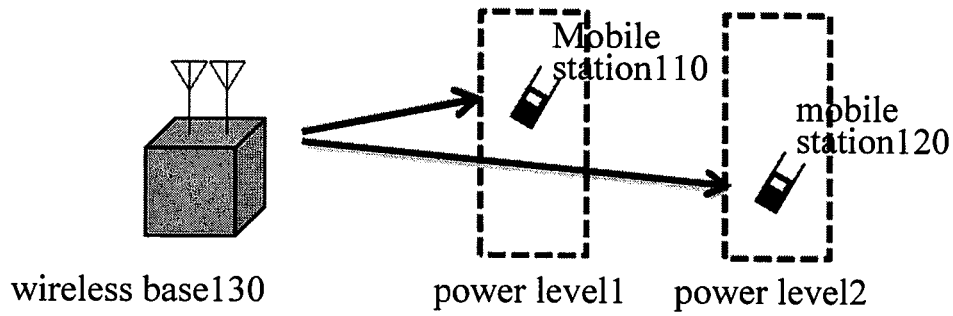
FIG. 1 is a schematic diagram showing a communication system according to one embodiment of the present invention.

FIG. 1 is a schematic diagram showing a communication system 100 according to one embodiment of the present invention. As shown in FIG. 1, the method for optimizing the rank of channel matrix according to one embodiment of the present invention may be applied to the Non-Orthogonal Multiple Access (NOMA) system 100. Specifically, in the communication system 100, mobile stations 110 and 120 form a mobile station pair using same time and frequency resources. A wireless base 130 transports data to the mobile station 110 by using power level 1 and transports data to the mobile station 120 by using power level 2. In addition, the communication system 100 may further employ the SU-MIMO technology. As shown in FIG. 1, the wireless base 130 may transport data to the mobile station 110 at power level 1 and the mobile station 120 at power level 2 by using multiple beams respectively, so as to further increase the capacity of the system.

Figure 2:
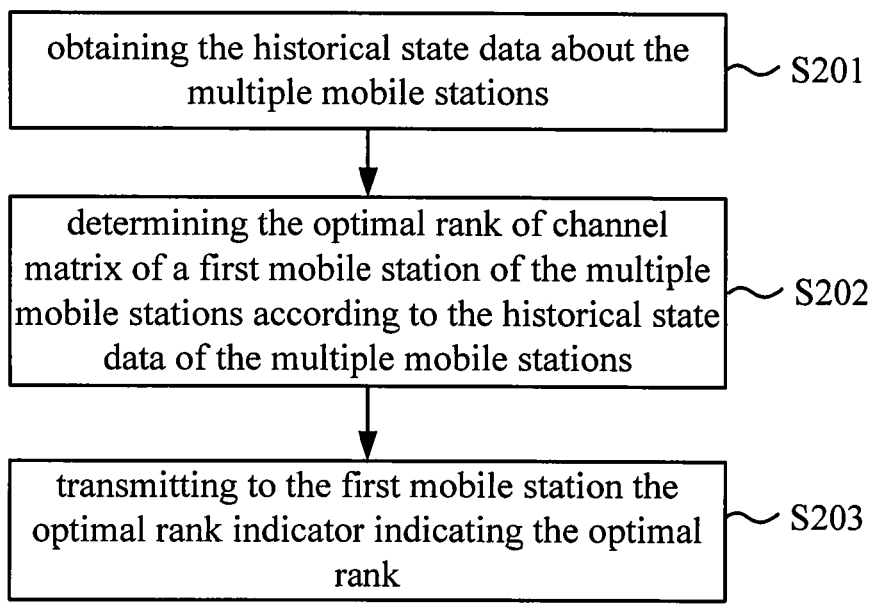
FIG. 2 is a flow chart showing a method for optimizing the rank of channel matrix according to one embodiment of the present invention.

FIG. 2 is a flow chart showing a method 200 for optimizing the rank of channel matrix according to one embodiment of the present invention. The method 200 shown in FIG. 2 may be applied to a wireless base. In the following, the method 200 for optimizing the rank of channel matrix according to one embodiment of the present invention will be described with reference to FIG. 2.

As shown in FIG. 2, in step S201, the historical state data of the plurality of mobile stations is obtained. For example, the state data received from the multiple mobile stations within a predetermined period of time may be obtained as the historical state data of the multiple mobile stations. In other words, the wireless base may observe the multiple mobile stations connected to the wireless base with the predetermined period of time.

The state data may be the communication state data of mobile stations, for example, a current rank indicator indicating the current rank of a mobile station, and a current state indicator indicating a current state and corresponding to the current rank. In such a case, in step S201, current rank indicators indicating current ranks of the mobile stations as well as current state indicators indicating current states and corresponding to the current ranks received from the multiple mobile stations within the predetermined period of time may be obtained. In one example according to the present invention, the current rank indicator indicating the current rank of a mobile station may be a Rank Indicator (RI). Furthermore, the current state indicator indicating the current state and corresponding to the current rank may be a set of a Pre-coding matrix indicator (PMI) and a Channel Quality Indicator (CQI), which correspond to the current rank indicated by the RI.

In step S202, the optimal rank of channel matrix of a first mobile station of the multiple mobile stations is determined according to the obtained historical state data of the multiple mobile stations. Preferably, when the rank of channel matrix of the first mobile station is the optimal rank, the sum of throughputs of the first mobile station in the formed multiple mobile station pairs is the maximum.

Figure 3:
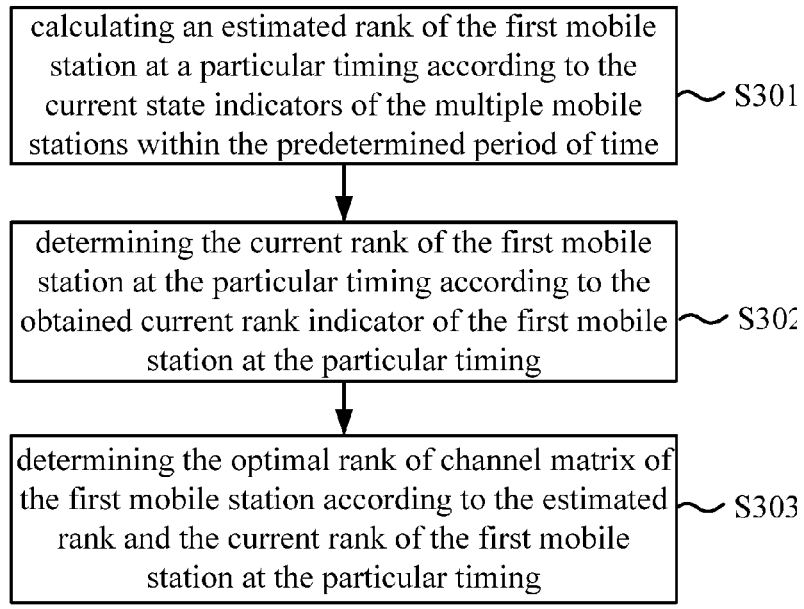
FIG. 3 is a flow chart showing a method for determining the optimal rank of channel matrix for one mobile station of multiple mobile stations according to the obtained historical state data of the multiple mobile stations according to one embodiment of the present invention.

FIG. 3 is a flow chart showing a method 300 for determining the optimal rank of channel matrix for the first mobile station of the multiple mobile stations according to the obtained historical state data of the multiple mobile stations according to one embodiment of the present invention. As shown in FIG. 3, in step S301, an estimated rank of the first mobile station at a particular timing is calculated according to the current state indicators of the multiple mobile stations within the predetermined period of time. Specifically, the predetermined period of time may be the predetermined period of time ending at the particular timing.

According to one example of the present invention, in a case that current rank indicators indicating current ranks of the mobile stations as well as current state indicators indicating current states and corresponding to the current ranks are received from the multiple mobile stations within the predetermined period of time, in step S301, instantaneous states of the first mobile station in respective mobile station pairs which are able to be formed may be calculated firstly according to the received current state indicators of the multiple mobile stations within the predetermined period of time, and an average state of the first mobile station within the predetermined period of time is calculated according to the current state indicator of the first mobile station obtained within the predetermined period of time. Then, in step S301, the estimated rank of the first mobile station at the particular timing may be obtained according to the calculated instantaneous state and average state.

For example, the estimated rank may be the rank of channel matrix when the sum of scheduling metrics corresponding to different current ranks received from the first mobile station within the predetermined period of time is the maximum. In other words, the estimated rank of the first mobile station at the particular timing is calculated according to the scheduling metrics corresponding to different current ranks received from the first mobile station within the predetermined period of time. Thus, in order to reduce the operation of the wireless base, preferably, only when current rank indicators indicating multiple current ranks are received from the first mobile station within the predetermined period of time, the estimated rank of the first mobile station at the particular timing is calculated according to step S301, and the optimal rank of channel matrix of the first mobile station is then determined. On the other hand, when only a current rank indicator indicating one current rank is received from the first mobile station within the predetermined period of time, the estimated rank of the first mobile station at the particular timing may not be calculated according to step S301, and the optimal rank of channel matrix is not determined for the first mobile station.

According to one example of the present invention, the estimated rank $RI_i^{est}(t_0)$ of the first mobile station at the particular timing $t_0$ may be calculated according to the calculated instantaneous state and average state through the following formula (1):

$$RI_i^{est}(t_0) = \arg\max_{\substack{RI_i^{est}(t)\in\{1,RI_i^{FB}(t)\}\\ RI_i^{FB}(t)\in\{1,\ldots,RI_{max}\}}} \left\{ \frac{1}{T_c} \sum_{t=t_0-T_c}^{t_0} \frac{\sum_{j=1,i\in S_j}^{N_u} \sum_{l=1}^{RI_i^{est}(t)} R_l(t,i|S_j)}{R_{avg}(t,i)} \right\} \quad (1)$$

In the formula (1), $Rl(t, i|S_j)$ represents the instantaneous throughput of the first mobile station $UE_i$ in the mobile station pair $S_j$ which can be formed at power level 1 at the timing t; $R_{avg}(t, i)$ represents the average power of $UE_i$ at the timing t; Nu represents the number of mobile station pairs which the first mobile station $UE_i$ is able to form with other mobile stations of the multiple mobile stations; $T_c$ represents the predetermined period of time; $RI_i^{FB}(t)$ represents the current rank indicated by the current rank indicator received from the first mobile station $UE_i$ at the timing t; $RI_i^{est}(t)$ represents the estimated rank of the first mobile station $UE_i$ at the timing t; $RI_{max}$ represents the maximum rank of channel matrix of the first mobile station. In addition, $$\frac{\sum_{j=1,i\in S_j}^{N_u} \sum_{l=1}^{RI_i^{est}(t)} R_l(t,i|S_j)}{R_{avg}(t,i)}$$

in the above formula (1) may represent the scheduling metric corresponding to the current rank received from the first mobile station at the timing t.

In step S302, the current rank of the first mobile station at the particular timing is determined according to the obtained current rank indicator of the first mobile station at the particular timing. Then, in step S303, the optimal rank of channel matrix of the first mobile station is determined according to the estimated rank and the current rank of the first mobile station at the particular timing. For example, the optimal rank $RI_i^{optimal}(t_0)$ of channel matrix of the first mobile station at the particular timing $t_0$ may be determined through the following formula (2):

$$RI_i^{optimal}(t_0) = \max(RI_i^{est}(t_0), RI_i^{FB}(t_0)) \quad (2)$$

As shown in formula (2), the maximum rank of the estimated rank and the current rank is selected as the optimal rank of channel matrix of the first mobile station, so that the sum of throughputs of the first mobile station in the multiple mobile station pairs which can be formed is the maximum for each of different current ranks received from the first mobile station within the predetermined period of time.

In addition, according to one example of the present invention, the method shown in FIG. 3 may further include determining whether the current rank of the first mobile station at the particular timing is the same as the estimated rank at the timing after step S302. If the current rank of the first mobile station at the particular timing is the same as the estimated rank, it means that the current rank of the first mobile station is the optimal rank. Preferably, in this case, the operation of determining the optimal rank of channel matrix of the first mobile station of the multiple mobile stations may not be carried out, that is, step S303 is not executed. And, only when the current rank of the first mobile station at the particular timing is different from the estimated rank, the operation of determining the optimal rank of channel matrix of the first mobile station of the multiple mobile stations is carried out. Thereby, the operation necessary to be carried out by the wireless base is reduced.

It is noted that respective steps of the method 300 shown in FIG. 3 is not necessarily executed in the order shown. Some steps may be executed reversely or in parallel. For example, calculation of the estimated rank of the first mobile station at the particular timing (S301) and determination of the current rank of the first mobile station at the particular timing (S302) may be performed simultaneously. It is also possible that step S302 is executed firstly and step S301 is then executed.

Back to FIG. 2, in step S203, the optimal rank indicator indicating the optimal rank is transmitted to the first mobile station so as to cause the first mobile station to set its rank of channel matrix to be the optimal rank indicated by the optimal rank indicator. Since the minimum value of the rank of channel matrix is 1, when the optimal rank is 1, even if the optimal rank indicator indicating the optimal rank is transmitted to the first mobile station, the first mobile station can not improve the throughput by setting its rank of channel matrix to be the optimal rank indicated by the optimal rank indicator to increase its rank of channel matrix. Thus, preferably, the optimal rank indicator indicating the optimal rank may be transmitted to the first mobile station only when the optimal rank is not equal to 1; and the optimal rank indicator indicating the optimal rank is not transmitted to the first mobile station, that is, step S203 is not executed, when the optimal rank is equal to 1. Accordingly, the signalling necessary for notifying the optimal rank indicator is reduced. Furthermore, according to one example of the present invention, in step S203, the generated optimal rank indicator may be transmitted by the wireless base or a device at an upper layer of the wireless base.

Figure 4:
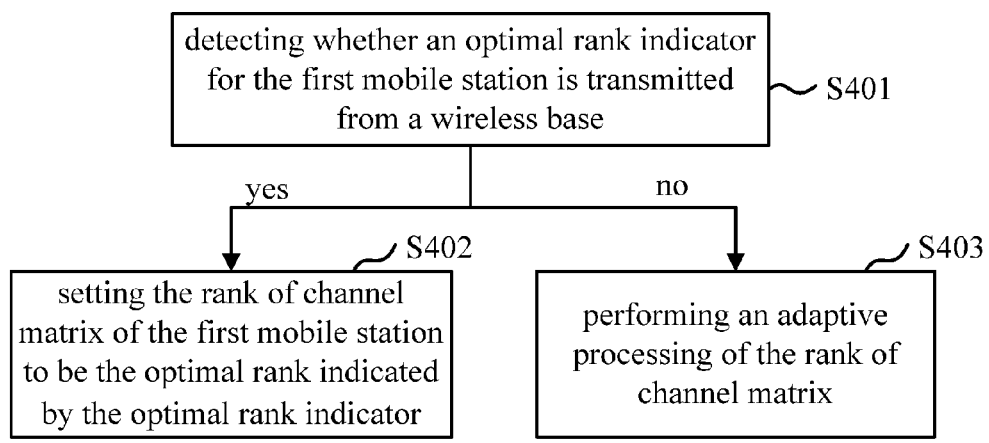
FIG. 4 is a flow chart showing a method for optimizing the rank of channel matrix according to another embodiment of the present invention.

As describe above, in the case that the wireless base generates the optimal rank indicator and transmits the same to the first mobile station according to the method shown in FIG. 2, according to the indication of the received optimal rank indicator, the first mobile station carries out the corresponding operation. FIG. 4 is a flow chart showing a method 400 for optimizing the rank of channel matrix according to another embodiment of the present invention. The method 400 shown in FIG. 4 may be applied to a first mobile station. In the embodiment shown in FIG. 4, multiple mobile stations including the first mobile station are connected to a same wireless base. Furthermore, according to one example of the present invention, the first mobile station is able to form mobile station pairs with other mobile stations of the multiple mobile stations and mobile stations in each mobile station pair share same time and/or frequency resources. In the following, the method 400 for optimizing the rank of channel matrix according to one embodiment of the present invention will be described with reference to FIG. 4.

As shown in FIG. 4, in step S401, it is detected whether an optimal rank indicator for the first mobile station is transmitted from a wireless base. For example, the wireless base may generate the optimal rank indicator for the first mobile station according to the method 200 shown in FIG. 2.

When the optimal rank indicator for the first mobile station is detected by the first mobile station from the signalling from the wireless base or the upper layer of the wireless base, the rank of channel matrix of the first mobile station is set to be the optimal rank indicated by the optimal rank indicator in step S402. As describe in conjunction with FIGS. 2 and 3 above, the wireless base determines the optimal rank for the first mobile station according to the historical state data of the multiple mobile stations connected to the wireless base. On the other hand, when the optimal rank indicator for the first mobile station is not detected by the first mobile station from the signalling from the wireless base or the upper layer of the wireless base, an adaptive processing of the rank of channel matrix is performed in step S403.

In the method for optimizing the rank of channel matrix according to the present invention, the optimal rank of channel matrix for one mobile station is determined by the wireless base according to the historical state data of the multiple mobile stations connected to the wireless base. When selecting the optimal rank of channel matrix for the mobile station, the wireless base considers not only the state of the mobile station itself but also possible interferences to the mobile station from other mobile stations, so that the selection may be carried out more accurately to improve the communication state of the mobile station.

Furthermore, according to one example of the present invention, in the adaptive processing of the rank of channel matrix in step S403, the rank of channel matrix applicable to a mobile station may be determined according to the detection result of the communication station of the mobile station itself. Alternatively, according to another example of the present invention, a set of power patterns may be pre-stored in the first mobile station and the wireless base. The set of power patterns includes multiple power patterns, and each power pattern includes power parameters for multiple mobile stations in mobile station pairs respectively. For example, a set P of power patterns may be pre-stored in the first mobile station and the wireless base. The set P of power patterns is represented by the following formula (3):

$$P=\{P_1, \ldots, P_m, \ldots, P_M\}, 1 \le m \le M \quad (3)$$

In the formula (3), M represents the number of power patterns included in the set of power patterns, and $P_m$ represents a power pattern included in the set P of power patterns. A mobile station pair may include two mobile stations, and $P_m$ may include power parameters respectively for two mobile stations in the mobile station pair. Specifically, $P_m$ may be represented by the following formula (4):

$$P_m=(\beta_{1,m}, \beta_{2,m}) \quad (4)$$

In the formula (4), $\beta_{1,m}$ represents the power parameter of the mobile station with better communication state (e.g. channel state) in the two mobile stations of the mobile station pair, and $\beta_{2,m}$ represents the power parameter of the mobile station with worse communication state (e.g. channel state) in the two mobile stations of the mobile station pair. For example, $\beta_{1,m}$ and $\beta_{2,m}$ may be the transmission power ratio of the two mobile stations of the mobile station pair.

Figure 5:
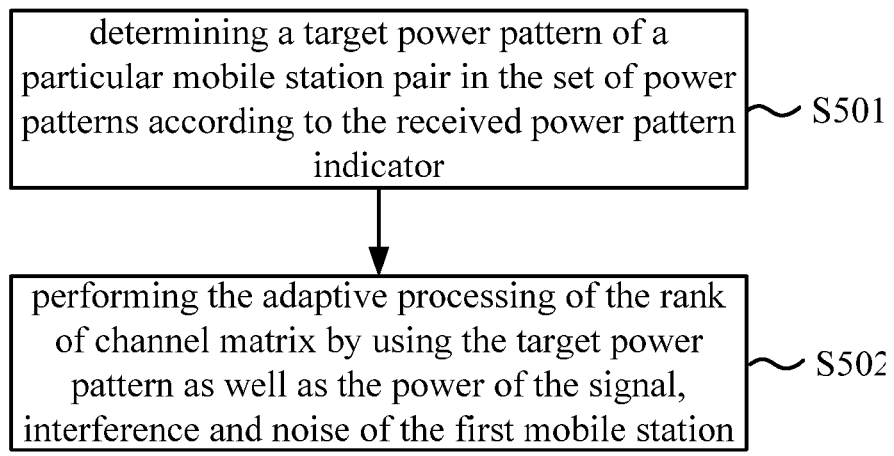
FIG. 5 is a flow chart showing a method for performing the adaptive processing of the rank of channel matrix according to one embodiment of the present invention.

The method 400 shown in FIG. 4 may further include receiving a power pattern indicator from the wireless base, and in step S403, an adaptive processing of the rank of channel matrix may be performed according to the method 500 shown in FIG. 5. FIG. 5 is a flow chart showing a method 500 for performing the adaptive processing of the rank of channel matrix according to one embodiment of the present invention.

As shown in FIG. 5, in step S501, a target power pattern of a particular mobile station pair is determined in the set of power patterns according to the received power pattern indicator. For example, as described above, the power pattern may include power parameters for two mobile stations in the mobile station pair. In such a case, the target power pattern may be determined in step S501, and a first power parameter of the first mobile station and a second power parameter of a mobile station other than the first mobile station in the particular mobile station pair are further obtained by the determined target power pattern. The mobile station with better communication state and the mobile station with worse communication state in the mobile station pair may be indicated by signalling from the wireless base or a device at its upper layer. Alternatively, since the mobile station with better communication state in the mobile station pair may receive the optimal rank indicator from the wireless base or the device at its upper layer, if a mobile station does not receive the optimal rank indicator for the mobile station from the wireless base or the device at its upper layer, it is possible to automatically recognize that the mobile station is the mobile station with worse communication state in the mobile station pair without notification by the signalling of the wireless base or a device at its upper layer.

Then, in step S502, the adaptive processing of the rank of channel matrix is performed by using the target power pattern as well as the power of the signal, interference and noise of the first mobile station so as to make the sum of throughputs of the first mobile station in multiple mobile station pairs which can be formed maximum. Preferably, in step S502, the first mobile station may take the signal from the mobile station other than the first mobile station in the particular mobile station pair as the interference of the first mobile station, calculates the signal-to-interference-and-noise ratio of the first mobile station by the first power parameter, the second power parameter as well as the power of the signal, interference and noise of the first mobile station, and performs the adaptive processing of the rank of channel matrix according to the signal-to-interference-and-noise ratio of the first mobile station.

In the following, a method for calculating the signal-to-interference-and-noise ratio of the first mobile station according to one example of the present invention will be described in conjunction with formulae (5)-(7). It is assumed that, in the present embodiment, the mobile stations and the wireless base are mobile stations and a wireless base in a NOMA system, and the number of power levels is less than or equal to 2 in the NOMA system of the present embodiment.

The signal $Y_n$ received at the mobile station $UE_n$ may be represented by the following formula (5):

$$Y_n = H_n \cdot (W_1 \cdot \sqrt{\beta_1 P} \cdot S_1 + W_2 \cdot \sqrt{\beta_2 P} \cdot S_2) + N_n \quad (5)$$

In the formula (5), $H_n$ represents a channel matrix, $W_n$ represents a precoding matrix, $S_n$ represents a data symbol transmitted from the wireless base to a mobile station $UE_n$, $N_n$ represents the sum of the interference between mobile stations and the Gauss white noise of the mobile station $UE_n$, P represents the transmission power of the wireless base, $\beta_1$ represents the first power parameter and $\beta_2$ represents the second power parameter, in which $\beta_1$ and $\beta_2$ may be normalized such that $\beta_1+\beta_2=1$.

The first mobile station $UE_1$ may perform Least Mean Square Deviation (MMSE) detection on its received signal $$\begin{pmatrix} s_{1,1} \\ s_{1,2} \end{pmatrix}$$

by using a weight VMMSE through a formula (6), in which the signal a mobile station ($UE_2$ in the present example) other than the first mobile station in the mobile station pair is taken as the interference of the first mobile station $UE_1$:

$$\begin{pmatrix} \hat{s}_{1,1} \\ \hat{s}_{1,2} \end{pmatrix} = \begin{pmatrix} vv_{11} & vv_{12} \\ vv_{21} & vv_{22} \end{pmatrix} \sqrt{\beta_2 P} \begin{pmatrix} s_{1,1} \\ s_{1,2} \end{pmatrix} + \begin{pmatrix} v'_{11} & v'_{12} \\ v'_{21} & v'_{22} \end{pmatrix} \sqrt{\beta_1 P} \begin{pmatrix} s_{2,1} \\ s_{2,2} \end{pmatrix} + \begin{pmatrix} z_{1,1} \\ z_{1,2} \end{pmatrix} \quad (6)$$

in which $$\begin{pmatrix} \hat{s}_{1,1} \\ \hat{s}_{1,2} \end{pmatrix} = V_{MMSE} \cdot Y_1, \begin{pmatrix} vv_{11} & vv_{12} \\ vv_{21} & vv_{22} \end{pmatrix} = V_{MMSE} \cdot H_1 W_1,$$

$$\begin{pmatrix} v'_{11} & v'_{12} \\ v'_{21} & v'_{22} \end{pmatrix} = V_{MMSE} \cdot H_1 W_2, \text{ and } (z_{1,1} \quad z_{1,2})^T = V_{MMSE} \cdot N_1.$$

$$\begin{pmatrix} vv_{11} & vv_{12} \\ vv_{21} & vv_{22} \end{pmatrix}$$

is the product of the weight $V_{MMSE}$ and the equivalent channel $H_1 W_1$ of $UE_1$, and $$\begin{pmatrix} z_{1,1} \\ z_{1,2} \end{pmatrix}$$

is the product of the weight $V_{MMSE}$ and the sum $N_1$ of the interference and noise of $UE_1$.

It is possible to calculate $$\begin{pmatrix} vv_{11} & vv_{12} \\ vv_{21} & vv_{22} \end{pmatrix} \text{ and } \begin{pmatrix} z_{1,1} \\ z_{1,2} \end{pmatrix}$$

according to the formula (6), and to further calculate the signal-to-interference-and-noise ratio (SINR) $\Gamma_1^I$ of the first mobile station UE1 at power level 1 of the NOMA system according to the following formula (7) based on the calculation result:

$$\Gamma_1^I = \frac{|vv_{ll}|^2 \beta_1 P}{|vv_{lm,l\neq m}|^2 \beta_1 P + (|v'_{l1}|^2 + |v'_{l2}|^2)\beta_2 P + |z_{1,l}|^2 P_{Noise}^{(1)}} \quad (7)$$

In the formula (7), $P_{Noise}^{(1)}$ represents the power of the noise of the first mobile station $UE_1$.

In the method described according to FIG. 5 and in conjunction with formulae (5)-(7), When performing the adaptive processing of the rank of channel matrix, it is considered not only the detection result of the first mobile station itself but also the interference to the first mobile station from the other mobile station in the mobile station pair where the first mobile station is located currently, so that the rank of channel matrix applicable to the first mobile station may be selected more accurately.

Figure 6:
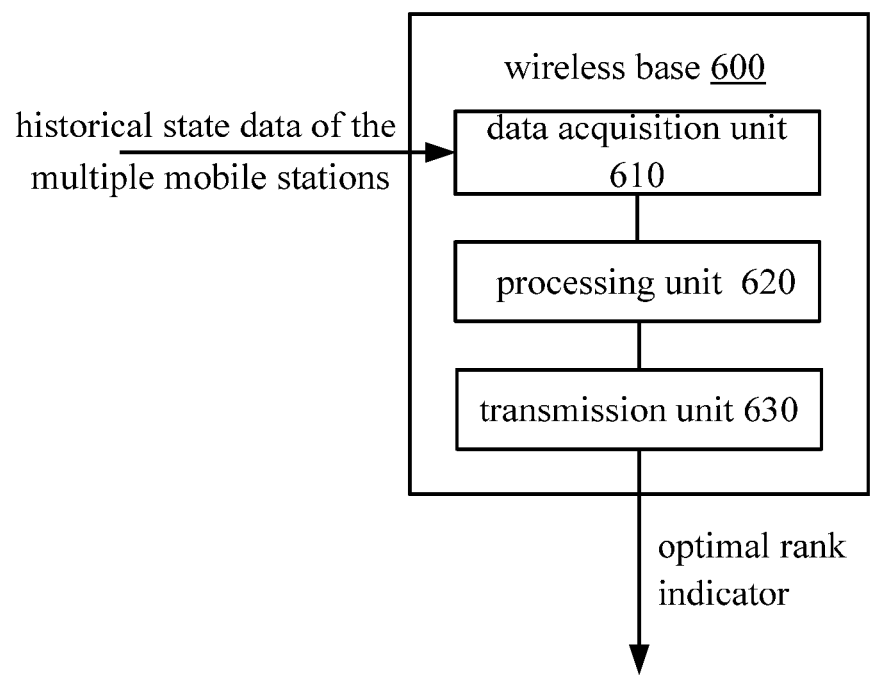
FIG. 6 is an exemplary structural block diagram showing a wireless base according to one embodiment of the present invention.

In the following, a wireless base of an embodiment of the present invention will be explained with reference to FIG. 6. FIG. 6 is an exemplary structural block diagram showing a wireless base 600 according to one embodiment of the present invention. As shown in FIG. 6, the wireless base 600 of the present embodiment includes a data acquisition unit 610, a processing unit 620 and a transmission unit 630. Respective units of the wireless base 600 may execute respective steps/functions of the method 200 for optimizing a rank of channel matrix in FIG. 2 above respectively. Therefore, only main components of the wireless base 600 will be described blow, and the detailed contents which have been already described in conjunction with FIGS. 2 and 3 above will be omitted.

The wireless base 600 may be connected to multiple mobile stations. According to one embodiment of the present invention, a first mobile station of multiple mobile stations connected to the wireless base 600 is able to form mobile station pairs with other mobile stations of the multiple mobile stations, and mobile stations in each mobile station pair share same time and/or frequency resources. As described above, for example, the wireless base 600 and the multiple mobile stations connected thereto may be a wireless base and mobile stations in a NOMA system.

The data acquisition unit 610 may obtain the historical state data of the multiple mobile stations. For example, the data acquisition unit 610 may include a reception section and a storage section. The reception section may receive the state data from the multiple mobile stations and stores the received state data in the storage section. The data acquisition unit 610 may obtain state data received from the multiple mobile stations within a predetermined period of time and stored in the storage section as the historical state data of the multiple mobile stations.

The state data may be the communication state data of mobile stations, for example, a current rank indicator indicating the current rank of a mobile station, and a current state indicator indicating a current state and corresponding to the current rank. In such a case, the data acquisition unit 610 may obtain current rank indicators indicating current ranks of the mobile stations as well as current state indicators indicating current states and corresponding to the current ranks received from the multiple mobile stations within the predetermined period of time. In one example according to the present invention, the current rank indicator indicating the current rank of a mobile station may be a Rank Indicator (RI). Furthermore, the current state indicator indicating the current state and corresponding to the current rank may be a set of a Pre-coding matrix indicator (PMI) and a Channel Quality Indicator (CQI), which correspond to the current rank indicated by the RI.

The processing unit 620 may determine the optimal rank of channel matrix of a first mobile station of the multiple mobile stations according to the obtained historical state data of the multiple mobile stations. Preferably, when the rank of channel matrix of the first mobile station is the optimal rank, the sum of throughputs of the first mobile station in multiple mobile station pairs which can be formed is the maximum.

The processing unit 620 may determine the optimal rank of channel matrix of the first mobile station according to the method 300 shown in FIG. 3. Specifically, the processing unit 620 may calculates an estimated rank of the first mobile station at a particular timing according to the current state indicators of the multiple mobile stations within the predetermined period of time. For example, the predetermined period of time may be the predetermined period of time ending at the particular timing. In a case that current rank indicators indicating current ranks of the mobile stations as well as current state indicators indicating current states and corresponding to the current ranks are received from the multiple mobile stations within the predetermined period of time, the processing unit 620 may firstly calculate instantaneous states of the first mobile station in respective mobile station pairs which are able to be formed according to the received current state indicators of the multiple mobile stations within the predetermined period of time, and calculate an average state of the first mobile station within the predetermined period of time according to the current state indicator of the first mobile station obtained within the predetermined period of time. Then, the processing unit 620 may obtain the estimated rank of the first mobile station at the particular timing according to the calculated instantaneous state and average state.

For example, the estimated rank may be the rank of channel matrix when the sum of scheduling metrics corresponding to different current ranks received from the first mobile station within the predetermined period of time is the maximum. In other words, the estimated rank of the first mobile station at the particular timing is calculated according to the scheduling metrics corresponding to different current ranks received from the first mobile station within the predetermined period of time. Thus, in order to reduce the operation of the wireless base, preferably, only when current rank indicators indicating multiple current ranks are received from the first mobile station within the predetermined period of time, the processing unit 620 calculates the estimated rank of the first mobile station at the particular timing, and then determines the optimal rank of channel matrix of the first mobile station. On the other hand, when only a current rank indicator indicating one current rank is received from the first mobile station within the predetermined period of time, the processing unit 620 may not calculate the estimated rank of the first mobile station at the particular timing, and may not determine the optimal rank of channel matrix for the first mobile station. As described above, the processing unit 620 may calculate the estimated rank of the first mobile station at the particular timing according to the calculated instantaneous state and average state through the above formula (1).

Next, the processing unit 620 may determine the current rank of the first mobile station at the particular timing according to the obtained current rank indicator of the first mobile station at the particular timing. Then, the processing unit 620 may determine the optimal rank of channel matrix of the first mobile station according to the estimated rank and the current rank of the first mobile station at the particular timing. As shown in the above formula (2), the processing unit 620 may select the maximum rank of the estimated rank and the current rank as the optimal rank of channel matrix of the first mobile station, so that the sum of throughputs of the first mobile station in the multiple mobile station pairs which can be formed is the maximum for each of different current ranks received from the first mobile station within the predetermined period of time.

In addition, according to one example of the present invention, after obtaining the estimated rank and the current rank, the processing unit 620 may determine whether the current rank of the first mobile station at the particular timing is the same as the estimated rank at the timing. If the current rank of the first mobile station at the particular timing is the same as the estimated rank, it means that the current rank of the first mobile station is the optimal rank. Preferably, in this case, the processing unit 620 may not carry out the operation of determining the optimal rank of channel matrix of the first mobile station of the multiple mobile stations. And, only when the current rank of the first mobile station at the particular timing is different from the estimated rank, the processing unit 620 may carry out the operation of determining the optimal rank of channel matrix of the first mobile station of the multiple mobile stations. Thereby, the operation necessary to be carried out by the wireless base is reduced.

The transmission unit 630 transmits to the first mobile station the optimal rank indicator indicating the optimal rank so as to cause the first mobile station to set its rank of channel matrix to be the optimal rank indicated by the optimal rank indicator. Since the minimum value of the rank of channel matrix is 1, when the optimal rank is 1, even if the optimal rank indicator indicating the optimal rank is transmitted to the first mobile station, the first mobile station cannot improve the throughput by setting its rank of channel matrix to be the optimal rank indicated by the optimal rank indicator to increase its rank of channel matrix. Thus, preferably, the transmission unit 630 may transmit the optimal rank indicator indicating the optimal rank to the first mobile station only when the optimal rank is not equal to 1; and the transmission unit 630 does not transmit the optimal rank indicator indicating the optimal rank to the first mobile station, that is, does not execute step S203, when the optimal rank is equal to 1. Accordingly, the signalling necessary for notifying the optimal rank indicator is reduced. Furthermore, according to one example of the present invention, the generated optimal rank indicator may be transmitted by the wireless base or a device at an upper layer of the wireless base.

Figure 7:
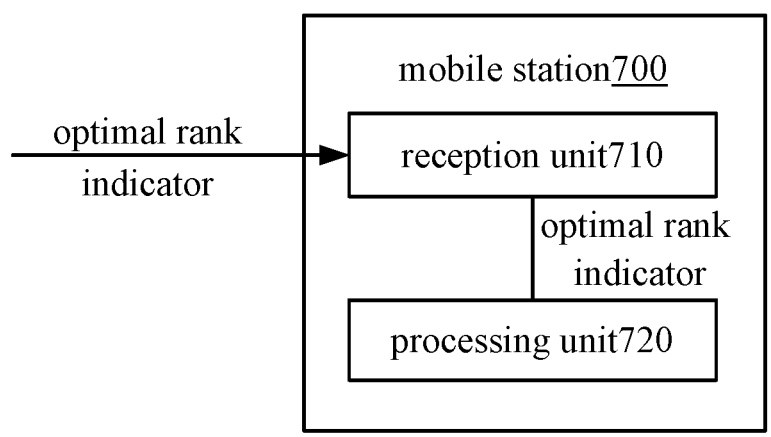
FIG. 7 shows an exemplary structural block diagram of a mobile station according to one embodiment of the present invention.

As describe above, in a case that the wireless base shown in FIG. 6 is used to generate the optimal rank indicator and to transmit the same to a mobile station, according to the indication of the received optimal rank indicator, the mobile station may carry out the corresponding operation. FIG. 7 shows an exemplary structural block diagram of a mobile station 700 according to one embodiment of the present invention. In the following, the mobile station 700 of the embodiment of the present invention will be explained with reference to FIG. 7. As shown in FIG. 7, the mobile station 700 of the present embodiment includes a reception unit 710 and a processing unit 720. Respective units of the mobile station 700 may execute respective steps/functions of the method 400 for optimizing a rank of channel matrix in FIG. 4 above respectively. Therefore, only main components of the mobile station 700 will be described blow, and the detailed contents which have been already described in conjunction with FIGS. 4 and 5 above will be omitted.

In the present embodiment, multiple mobile stations including the mobile station 700 may be connected to a same wireless base. Furthermore, according to one example of the present invention, the mobile station 700 is able to form mobile station pairs with other mobile stations of the multiple mobile stations, and mobile stations in each mobile station pair share same time and/or frequency resources.

As shown in FIG. 7, the reception unit 710 may detect whether an optimal rank indicator for the mobile station is transmitted from a wireless base. For example, the wireless base may generate the optimal rank indicator for the mobile station 700 according to the method 200 shown in FIG. 2.

When the reception unit 710 detects the optimal rank indicator for the first mobile station from the signaling from the wireless base or the upper layer of the wireless base, the processing unit 720 sets the rank of channel matrix of the mobile station 700 to be the optimal rank indicated by the optimal rank indicator. As describe in conjunction with FIGS. 2 and 3 above, the wireless base determines the optimal rank for the mobile station 700 according to the historical state data of the multiple mobile stations connected to the wireless base. On the other hand, when the reception unit 710 does not detect the optimal rank indicator for the mobile station 700 from the signalling from the wireless base or the upper layer of the wireless base, the processing unit 720 may perform an adaptive processing of the rank of channel matrix.

In the wireless base and mobile stations according to embodiments of the present invention, the optimal rank of channel matrix for one mobile station is determined by the wireless base according to the historical state data of the multiple mobile stations connected to the wireless base. When selecting the optimal rank of channel matrix for the mobile station, the wireless base considers not only the state of the mobile station itself but also possible interferences to the mobile station from other mobile stations, so that the selection may be carried out more accurately to improve the communication state of the mobile station.

Furthermore, according to one example of the present invention, in the adaptive processing of the rank of channel matrix, the processing unit 720 may determine the rank of channel matrix applicable to a mobile station according to the detection result of the communication station of the mobile station itself. Alternatively, according to another example of the present invention, the mobile station shown in FIG. 7 may further include a storage unit. A set of power patterns may be pre-stored in the storage unit of the mobile station and the wireless base. The set of power patterns includes multiple power patterns, and each power pattern includes power parameters for multiple mobile stations in mobile station pairs respectively.

In this case, the reception unit 710 may also receive a power pattern indicator from the wireless base, and the processing unit 720 may perform an adaptive processing of the rank of channel matrix according to the received power pattern indicator. For example, the processing unit 720 may perform the adaptive processing of the rank of channel matrix according to the method 500 shown in FIG. 5. Specifically, the processing unit 720 may determine a target power pattern of a particular mobile station pair in the set of power patterns according to the received power pattern indicator. The particular mobile station pair may be the mobile station pair where the mobile station 700 is located currently, and the particular mobile station pair may include the mobile station 700 and another mobile station other than the mobile station 700. The power pattern may include power parameters for the mobile station 700 and another mobile station other than the mobile station 700 in the mobile station pair. In such a case, the processing unit 720 may determine the target power pattern, and may further obtain a first power parameter of the mobile station 700 and a second power parameter of a mobile station other than the mobile station 700 in the particular mobile station pair by the determined target power pattern. The mobile station with better communication state and the mobile station with worse communication state in the mobile station pair may be indicated by signaling from the wireless base or a device at its upper layer. Alternatively, since the mobile station with better communication state in the mobile station pair may receive the optimal rank indicator from the wireless base or the device at its upper layer, if a mobile station does not receive the optimal rank indicator for the mobile station from the wireless base or the device at its upper layer, the processing unit 720 may automatically recognize that the mobile station 700 is the mobile station with worse communication state in the mobile station pair without notification by the signalling of the wireless base or a device at its upper layer.

Then, the processing unit 720 performs the adaptive processing of the rank of channel matrix by using the target power pattern as well as the power of the signal, interference and noise of the mobile station 700 to make the sum of throughputs of the mobile station 700 in multiple mobile station pairs which can be formed maximum. Preferably, the processing unit 720 may take the signal from the mobile station other than the mobile station 700 in the particular mobile station pair as the interference of the mobile station 700, calculates the signal-to-interference-and-noise ratio of the mobile station 700 by the first power parameter, the second power parameter as well as the power of the signal, interference and noise of the mobile station 700, and performs the adaptive processing of the rank of channel matrix according to the signal-to-interference-and-noise ratio of the first mobile station. As described above, the processing unit 720 may calculate the signal-to-interference-and-noise ratio of the mobile station 700 according to the calculated instantaneous state and average state through the above formulae (5)-(7).

In the present example, since the processing unit 720 takes the signal from the mobile station other than the mobile station 700 in the particular mobile station pair as the interference of the mobile station 700 and selects the rank of channel matrix by using the first power parameter and the second power parameter indicating respectively the transmission power of mobile stations in the particular mobile station pair, when performing the adaptive processing of the rank of channel matrix, the processing unit 720 considers not only the detection state of the mobile station 700 itself but also the interference to the mobile station 700 from the mobile station other than the mobile station 700 in the mobile station pair where the mobile station 700 is located currently, so that the rank of channel matrix applicable to the mobile station 700 may be selected more accurately.

It can be recognized by ordinary skills in the art that units, modules and algorithm steps of respective examples described in conjunction with embodiments disclosed in the present specification may be implemented in electronic hardware, computer software or the combination of both. And, the computer software may be placed in a computer storage medium in any form. In order to clearly explain the interchangeable between software and hardware, components and steps of respective example have already been described generally according to functions in the above description. Whether to perform such functions in hardware or in software depends on particular applications of the technical scheme as well as design constrains. Those skilled in the art may use different methods to implement the described functions for each of particular applications, however, such implementation should not be considered beyond the scope of the present invention.

It should be understood by those skilled in the art that a variety of modifications, combinations, partial combinations and substitutions may be made to the present invention depending on the design requirements and other factors as long as they are within the scope of the attached claims and its equivalence.

What is claimed is:

1. A method for optimizing the rank of channel matrix and being applied to a wireless base to which a plurality of mobile stations are connected, the method comprising:
   obtaining the historical state data of the plurality of mobile stations;
   determining the optimal rank of channel matrix of a first mobile station of the plurality of mobile stations according to the obtained historical state data of the plurality of mobile stations; and transmitting to the first mobile station the optimal rank indicator indicating the optimal rank so as to cause the first mobile station to set its rank of channel matrix to be the optimal rank indicated by the optimal rank indicator, wherein the method further comprising: forming mobile station pairs by using the plurality of mobile stations, each of the mobile station pairs including the first mobile station and one of other mobile stations of the plurality of mobile stations, mobile stations in each mobile station pair share same time and/or frequency resources, and when the rank of channel matrix of the first mobile station is the optimal rank, the sum of throughputs of the first mobile station in a plurality of mobile station pairs which can be formed is the maximum, wherein said obtaining the historical state data of the plurality of mobile stations comprises:

obtaining current rank indicators and current state indicators received from the plurality of mobile stations within a predetermined period of time, the current rank indicators indicating current ranks of the mobile stations and the current state indicators indicating current states and corresponding to the current ranks;

said determining the optimal rank of channel matrix for a first mobile station of the plurality of mobile stations according to the obtained historical state data of the plurality of mobile stations comprises:

calculating an estimated rank of the first mobile station at a particular timing according to the current state indicators of the plurality of mobile stations within the predetermined period of time, determining the current rank of the first mobile station at the particular timing according to the obtained current rank indicator of the first mobile station at the particular timing, determining the optimal rank of channel matrix of the first mobile station according to the estimated rank and the current rank of the first mobile station at the particular timing.

2. The method according to claim 1, wherein said calculating an estimated rank of the first mobile station at a particular timing according to the current state indicators of the plurality of mobile stations within the predetermined period of time comprises:

calculating instantaneous states of the first mobile station in respective mobile station pairs which are able to be formed according to the current state indicators of the plurality of mobile stations within the predetermined period of time;

calculating an average state of the first mobile station within the predetermined period of time according to the current state indicator of the first mobile station obtained within the predetermined period of time; and obtaining the estimated rank of the first mobile station at the particular timing according to the calculated instantaneous state and average state.

3. The method according to claim 1, wherein when current rank indicators indicating a plurality of current ranks are received from the first mobile station within the predetermined period of time, the optimal rank of channel matrix of the first mobile station of the plurality of mobile stations is determined; and when only a current rank indicator indicating one current rank is received from the first mobile station within the predetermined period of time, the optimal rank of channel matrix of the first mobile station of the plurality of mobile stations is not determined.

4. The method according to claim 1, wherein when the current rank of the first mobile station at the particular timing is different from the estimated rank, the optimal rank of channel matrix of the first mobile station of the plurality of mobile stations is determined; and when the current rank of the first mobile station at the particular timing is the same as the estimated rank, the optimal rank of channel matrix of the first mobile station of the plurality of mobile stations is not determined.

5. The method according to claim 1, wherein when the optimal rank is not equal to 1, the optimal rank indicator indicating the optimal rank is transmitted to the first mobile station, when the optimal rank is equal to 1, the optimal rank indicator indicating the optimal rank is not transmitted to the first mobile station.

6. A wireless base connected to a plurality of mobile stations, the wireless base comprising:

a processor, configured to obtain the historical state data of the plurality of mobile stations;

the processor is further configured to determine the optimal rank of channel matrix of a first mobile station of the plurality of mobile stations according to the obtained historical state data of the plurality of mobile stations; and a transmitter configured to transmit to the first mobile station the optimal rank indicator indicating the optimal rank so as to cause the first mobile station to set its rank of channel matrix to be the optimal rank indicated by the optimal rank indicator, wherein the method further comprising: forming mobile station pairs by using the plurality of mobile stations, each of the mobile station pairs including the first mobile station and one of other mobile stations of the plurality of mobile stations, mobile stations in each mobile station pair share same time and/or frequency resources, and when the rank of channel matrix of the first mobile station is the optimal rank, the sum of throughputs of the first mobile station in a plurality of mobile station pairs which can be formed is the maximum, wherein the obtained historical state data of the plurality of mobile stations comprises current rank indicators and current state indicators received from the plurality of mobile stations within a predetermined period of time, the current rank indicators indicating current ranks of the mobile stations and the current state indicators indicating current states and corresponding to the current ranks, the processor calculates an estimated rank of the first mobile station at a particular timing according to the current state indicators of the plurality of mobile stations within the predetermined period of time, determines the current rank of the first mobile station at the particular timing according to the obtained current rank indicator of the first mobile station at the particular timing, and determines the optimal rank of channel matrix of the first mobile station according to the estimated rank and the current rank of the first mobile station at the particular timing.

7. The wireless base according to claim 6, wherein
the processor calculates instantaneous states of the first mobile station in respective mobile station pairs which are able to be formed according to the current state indicators of the plurality of mobile stations within the predetermined period of time, calculates an average state of the first mobile station within the predetermined period of time according to the current state indicator of the first mobile station obtained within the predetermined period of time, and obtains the estimated rank of the first mobile station at the particular timing according to the calculated instantaneous state and average state.

8. The wireless base according to claim 6, wherein
when the processor receives current rank indicators indicating a plurality of current ranks from the first mobile station within the predetermined period of time, the processor determines the optimal rank of channel matrix of the first mobile station of the plurality of mobile stations; and
when the processor receives only a current rank indicator indicating one current rank from the first mobile station within the predetermined period of time, the processor does not determine the optimal rank of channel matrix of the first mobile station of the plurality of mobile stations.

9. The wireless base according to claim 6, wherein
when the current rank of the first mobile station at the particular timing is different from the estimated rank, the processor determines the optimal rank of channel matrix of the first mobile station of the plurality of mobile stations; and
when the current rank of the first mobile station at the particular timing is the same as the estimated rank, the processor does not determine the optimal rank of channel matrix of the first mobile station of the plurality of mobile stations.

10. The wireless base according to claim 6, wherein
when the optimal rank is not equal to 1, the transmitter transmits the optimal rank indicator indicating the optimal rank to the first mobile station,
when the optimal rank is equal to 1, the transmitter does not transmit the optimal rank indicator indicating the optimal rank to the first mobile station.

* * * * *